US009269057B1

(12) United States Patent
Chandra et al.

(10) Patent No.: US 9,269,057 B1
(45) Date of Patent: Feb. 23, 2016

(54) USING SPECIALIZED WORKERS TO IMPROVE PERFORMANCE IN MACHINE LEARNING

(71) Applicant: Google Inc., Mountain View, CA (US)

(72) Inventors: Tushar Deepak Chandra, Los Altos, CA (US); Tal Shaked, Los Altos, CA (US); Tze Way Eugene Ie, San Francisco, CA (US); Yoram Singer, Palo Alto, CA (US); Joshua Redstone, Cambridge, MA (US)

(73) Assignee: Google, Inc., Mountain View, CA (US)

( * ) Notice: Subject to any disclaimer, the term of this patent is extended or adjusted under 35 U.S.C. 154(b) by 205 days.

(21) Appl. No.: 14/102,718

(22) Filed: Dec. 11, 2013

(51) Int. Cl.
*G06N 99/00* (2010.01)

(52) U.S. Cl.
CPC ................................. *G06N 99/005* (2013.01)

(58) Field of Classification Search
CPC ...................................................... G06N 99/005
See application file for complete search history.

(56) References Cited

U.S. PATENT DOCUMENTS

| 7,650,331 | B1 | 1/2010 | Dean et al. | |
|---|---|---|---|---|
| 8,429,103 | B1 | 4/2013 | Aradhye et al. | |
| 2002/0162107 | A1* | 10/2002 | Gutta | G06N 99/005 725/46 |
| 2014/0201753 | A1* | 7/2014 | He | G06F 9/5066 718/104 |
| 2014/0379619 | A1* | 12/2014 | Permeh | G06N 99/005 706/12 |

OTHER PUBLICATIONS

Lane, "Machine Learning Techniques for the Computer Security Domain of Anomaly Detection," PhD thesis, Purdue University, Aug. 2000, 151 pages.
Frieβ et al., "The Kernel-Adatron algorithm: a Fast and Simple Learning Procedure for Support Vector Machines," Proceedings of the Fifteenth International Conference on Machine Learning, 1998, pp. 188-196.
Wang and O'Boyle, Mapping Parallelism to Multi-cores: A Machine Learning Based Approach, Proceedings of the 14th ACM SIGPLAN symposium on Principles and practice of parallel programming, Feb. 14-18, 2009, pp. 75-84.
Amershi et al., "ReGroup: Interactive Machine Learning for On-Demand Group Creation in Social Networks," Proceedings of the SIGCHI Conference on Human Factors in Computing Systems, May 5-10, 2012, pp. 21-30.
Jin et al., "OpinionMiner: A Novel Machine Learning System for Web Opinion Mining and Extraction," Proceedings of the 15th ACM SIGKDD international conference on Knowledge discovery and data mining, Jun. 28-Jul. 1, 2009, pp. 1195-1204.

* cited by examiner

*Primary Examiner* — Jeffrey A Gaffin
*Assistant Examiner* — Thomas Fink
(74) *Attorney, Agent, or Firm* — Fish & Richardson P.C.

(57) ABSTRACT

Systems and techniques are disclosed for generating weighted machine learned models using multi-shard combiners. A learner in a machine learning system may receive labeled positive and negative examples and workers within the learner may be configured to receive either positive or negative examples. A positive and negative statistic may be calculated for a given feature and may either be applied separately in a model or may be combined to generate an overall statistic.

36 Claims, 14 Drawing Sheets

700

| OUTCOME | United States | Broadband | English | Viewed Video X |
|---|---|---|---|---|
| 1 | 1 | 0 | 1 | 0 |

USING SPECIALIZED WORKERS TO IMPROVE PERFORMANCE IN MACHINE LEARNING

BACKGROUND

Conducting regression analysis based on a very large dataset may require an undesirably large number of resources. Regression analysis may correspond to a statistical process for estimating the relationships among variables. It may be used to predict or forecast a given action or event and may be based on analyzing historical or test data containing variables that contribute to the prediction and forecasting. Similarly, ranking content based on a very large dataset may also require an undesirably large number of resources.

BRIEF SUMMARY

According to implementations of the disclosed subject matter, multiple examples for distribution to multiple workers may be received. Each worker (e.g., a mapper or a reducer) may only receive examples associated with a first class (e.g., only positive examples) or may only receive examples associated with the second class (e.g., negative examples). Each example may be determined to be either associated with the first class or with the second class and examples associate with the first class may be distributed to workers configured to only receive examples associated with the first class and examples associated with the second class may be distributed to workers configured to only receive examples associated with the second class. A weight based on the examples associated with the first class may be generated for a feature and a weight based on the examples associated with the second class may be generated for the same feature. An example sorter may determine whether an example is examples associated with the first or with the second class. Alternatively, examples associated with the second class may be blocked from being distributed to a worker configured to receive examples associated with the first class and examples associated with the first class may be blocked from being distributed to a worker configured to receive examples associated with the second class. One or more workers may be removed based on determining that a threshold number of examples from the plurality of examples have been distributed. A first number of workers configured to receive examples associated with the first class may be removed based on determining that a threshold number of examples have been distributed and, similarly, a second number of workers configured to receive examples associated with the second class may be removed based on determining that a threshold number of examples have been distributed. The first and second numbers may be the same number.

Systems and techniques according to the present disclosure may generate positive, negative feature, or class based statistics for features processed by a learner and generate weights for the feature. Workers may be utilized to accumulate statistics for features across multiple instances, allowing an improved overall performance. Additional characteristics, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 7a shows an example illustration of a labeled example, according to an implementation of the disclosed subject matter.

DETAILED DESCRIPTION

Figure 6:
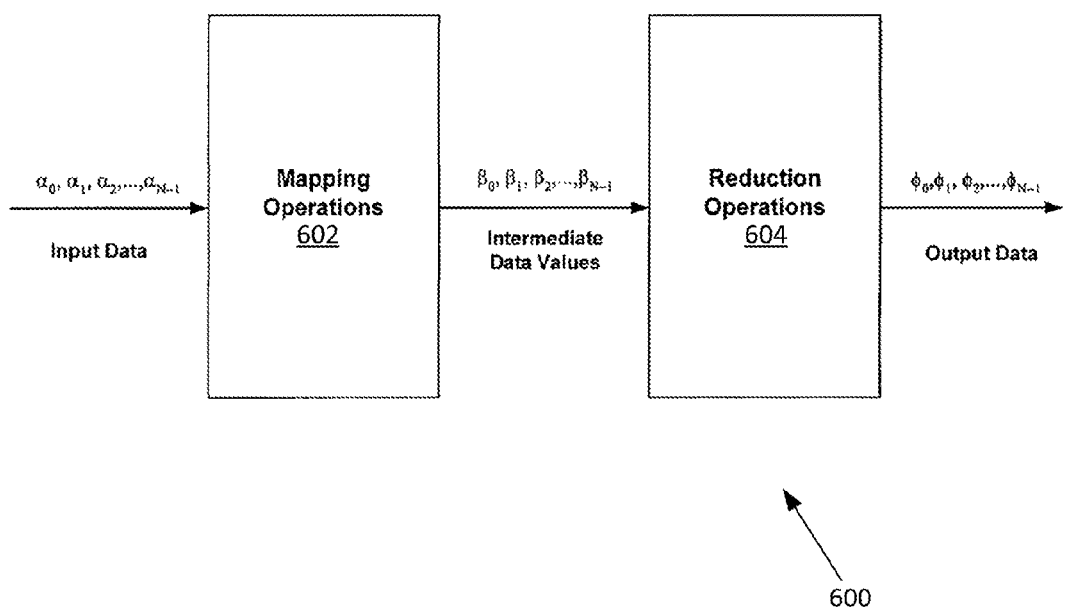
FIG. 6 shows an example process for a mapreduce operation, according to an implementation of the disclosed subject matter.

Techniques described herein can be applied to large-scale data processing and may be applied to large scale parallel data processing for machine learning. Such large-scale processing may be performed in a distributed data processing system, such as a datacenter or a network of datacenters. For example, large-scale Internet services and the massively parallel computing infrastructure that support such services may employ warehouse-sized computing systems, made up of thousands or tens of thousands of computing nodes. FIG. 6 shows a general overview of a large-scale data processing model 600 that may be applied herein to train a machine learning system. The data processing model 600 may include mapping operations 602 and reduction operations 604. The mapping operations 602 may apply one or more mapping operations to a set of input data $\alpha_i$ (e.g., text files, records, logs, sorted maps, etc.) to provide a set of intermediate data values $\beta_i$. The reduction operations 604 may apply one or more reduction operations to the set of intermediate data values $\beta_i$ to provide a set of output data $\phi_i$ (e.g., tables, sorted maps, record I/O, etc.). According to one or more implementations, the mapping operations 602 may be implemented by one or more application-specific mapping functions, which map a set of input data $\alpha_i$ to a set of intermediate data values $\beta_i$. The intermediate data values $\beta_i$ may be stored in one or more intermediate data structures. Some examples of intermediate data structures include files, buffers, histograms, count tables and any other suitable data structure or device for storing digital information. The intermediate data values $\beta_i$ are processed by the reduction operations 604, which may be implemented by one or more application-specific reduction functions, which reduce the set of intermediate data values $\beta_i$ to a set of output data $\phi_i$.

The techniques disclosed herein, such as the general process described with respect to FIG. 6, may utilize a mapreduce process. In general, in a mapreduce process, data may be divided into input data blocks that are processed by mappers. The mappers apply a map operation to the input to produce key-value pairs (e.g., such as feature-statistic pairs, as disclosed herein) as map output, and the map output is sent to reducers where values associated with the same key are combined to produce a final value for each key. Each reducer may be responsible for a subset of the keys. The process for distributing data to reducers may be referred to as shuffling, and may result in each reducer receiving, from each mapper, the key-value pairs for which the reducer is responsible. Further description and examples of mapreduce or machine learning and similar techniques are provided in U.S. Pat. Nos. 7,650,331 and 8,429,103, the contents of each of which are incorporated by reference herein for all purposes, in their entirety.

Figure 7B:
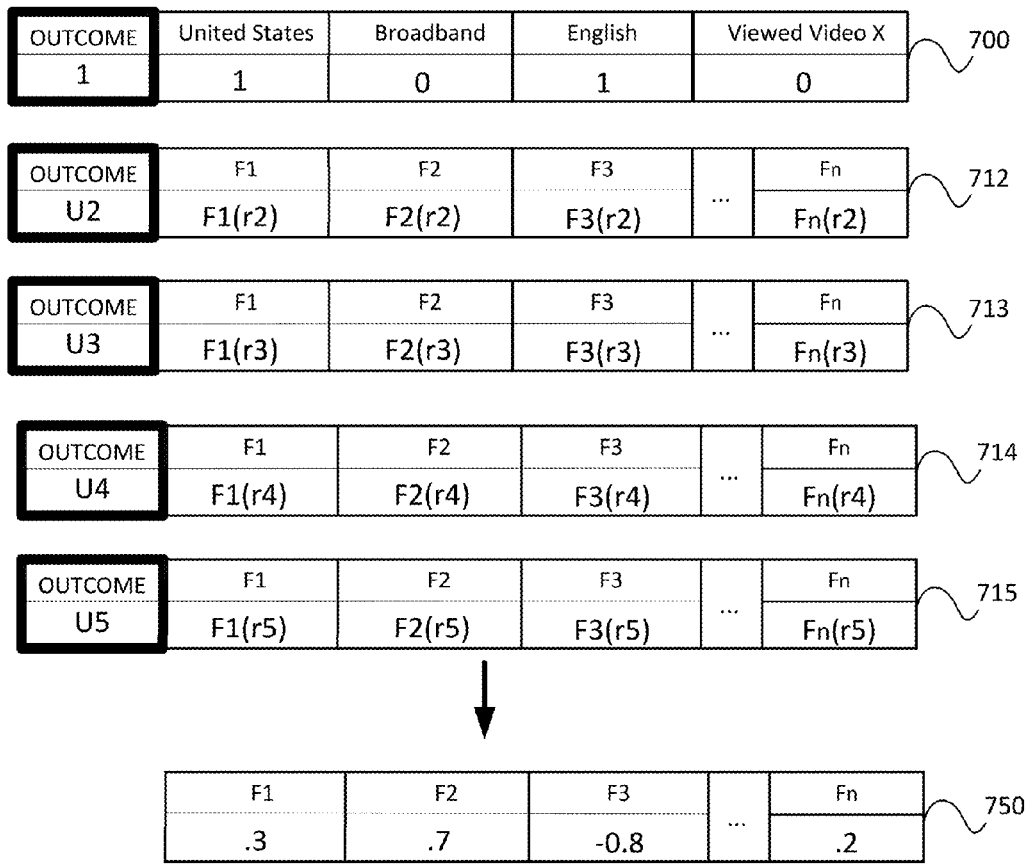
FIG. 7b shows an example illustration of generated weights, according to an implementation of the disclosed subject matter.

The techniques disclosed herein may be used to generate and improve machine learned models using supervised learning data such as labeled examples. The labeled examples may be input into a machine learning system and the output from the machine learning system may be a machine learned model that contains weights that are generated in response to the labeled data. The labeled examples may contain both an outcome and properties associated with a specific instance. As an example, as shown in FIG. 7a, a labeled example 700 may include an outcome 710 that a user viewed a music video X via a webpage. The example properties associated with the user viewing the music video are that the user is located in the United States 720, did not access the video via a broadband connection 730, has selected a user preference of English 740, and has not viewed the video before 750. As shown in FIG. 7a, a positive property or an affirmative result such as the user being located in the United States and selecting English as a preferred language may be represented with a true Boolean value (e.g., 1 in this example) and a negative property or result such as the user not using a broadband connection or not having viewed music video X may be represented with a false Boolean value (e.g., 0 in this example). Alternatively, a positive value may be indicted by the presence of a feature and a negative outcome may be represented by an omission. As an example, a labeled example may include an outcome that a user viewed a music video Y via a webpage. The example properties associated with the user viewing the music video are that the user is located in the United States, did not access the video via a broadband connection, has selected a user preference of English, and has not viewed the video before. A positive property or an affirmative result such as the user being located in the United States and selecting English as a preferred language may be represented by the presence of the features and a negative property or result such as the user using a broadband connection or having viewed music video Y may be represented by omission of the respective features. More specifically, the labeled example may be represented by <US, English, Outcome=1>, such that only the features associated with a positive property are present. The properties (e.g., located in the United States, view the video via a broadband connection, has selected a user preference of English, has viewed the video before) may be referred to as features, as described in further detail herein. It will be understood that although a binary categorization (e.g., a positive and negative distinction) is discussed, the techniques disclosed herein may be applied to multi-class classification where more than two classes or labels are present. As an example, a multi-class classification arrangement may contain multiple groups identified as group 1 (e.g., associated with a value between 0-20), group 2 (e.g., associated with a value between 21-40), group 3 (e.g., associated with a value between 41-60), and group 4 (e.g., associated with a value greater than 61). Workers may be specialized in a single class or a subset of a class such as, for example, a worker may be specialized for a class containing group 3 examples and/or features.

A machine learning system may receive labeled data (e.g., labeled examples) to train a machine learned model that contains weights that are generated in response to the supervised labeled data. More specifically, as an example, the labeled examples 712, 713, 714, and 715, each of which contain an outcome Boolean 1 for example 700 as well as outcomes U2, U3, U4, and U5 respective to the labeled examples 712, 713, and 714 which may also be Boolean values (e.g., 0 or 1 corresponding to a positive or negative outcome). The labeled examples 700, 712, 713, 714, and 715 may be received by the machine learning system to generate a weighted model 750. As shown, the weights 0.3, 0.7, 0.8, and 0.2 may correspond to the features F1, F2, F3, and Fn such that Fn represents the nth and last feature analyzed by the machine learning model.

Figure 7C:
FIG. 7c shows an example illustration of applying weights, according to an implementation of the disclosed subject matter.

According to an implementation of the disclosed subject matter, as shown in FIG. 7c, the machine learned model may be applied to an unlabeled instance to generate a regression based prediction (e.g., a logistic regression, a linear regression, or the like) or a ranking (e.g., a web search result list, a related content item, or the like). An unlabeled instance may include one or more features, at least one of which has a weight associated with it, in the model. The weight may be any applicable weight such as a Boolean weight (i.e., 1 or 0), a fractional weight (e.g., 0.7 or 0.9), or the like. As a specific example of Boolean weights, the model 750 may be applied to an unlabeled instance 760. The weight for F1 (i.e., 0.3) in the model 750 may be multiplied by the Boolean value, 0, associated with F1 in the unlabeled instance 760. Here, the Boolean value, 0, may indicate a negative response to the presence of F1 in the unlabeled instance 760. The multiplication may result in a 0 value corresponding to F1 for the unlabeled instance 760. Similarly, the weight for F2 (i.e., 0.7) in the model 750 may be multiplied by the Boolean value, 1, associated with F2 in the unlabeled instance 760. The multiplication may result in a value of 0.7 corresponding to F2 for the unlabeled instance 760. Similarly, the weight for F3 (i.e., −0.8) in the model 750 may be multiplied by the Boolean value, 1, associated with F3 in the unlabeled instance 760. The multiplication may result in a value of −0.8 corresponding to F3 for the unlabeled instance 760. Similarly, the weight for F4 (i.e., 0.2) in the model 750 may be multiplied by the Boolean value, 0, associated with F4 in the unlabeled instance 760. The multiplication may result in a value of 0 corresponding to F4 for the unlabeled instance 760. The values calculated based on applying the machine learned model to an unlabeled instance may generate a regression based prediction. Continuing the example, the resulting values (i.e., 0, 0.7, −0.8, and 0) may be added together to generate a logistic regression probability 770 for a given outcome that the model was trained for. In this example the probability is −0.1 (i.e., 0+0.7−0.8+0) and may indicate that there is a 10% chance that the outcome for the unlabeled instance 760 will be negative. Alternatively or in addition, a function may be applied to convert the raw prediction into a prediction with a real-world meaning. For example, the raw prediction x in logistic regression may be converted into an "odd" by computing $e^x$. The odds may be further converted into a probability, i.e., a raw prediction x may be converted into a probability by computing $e^{x/(1+e^x)}$. As an example, the odd for a feature may be represented by $e^{(-0.1)}$. The probability may be represented by $e^{-0.1/(1+e^{-0.1})}$, or the like. The specific values and operations described with respect to this and other examples disclosed herein are illustrative only, and other values and operations may be used in various embodiments. $e^x$.

Alternatively or in addition, the machine learned model may be resubmitted to the machine learning system. The resubmitted machine learned model may be refined based on the machine learning system such that it is improved (e.g., to produce an improved probability or ranking when using the learned model). Alternatively or in addition, the resubmitted learned model may be adapt to changed data such as, for example, when the labeled examples reflect a real world current event. The resubmitted machine learned model may be used by the machine learning system to generate one or more statistics based on labeled examples. As disclosed herein, a machine learned model may be used by one or more mappers to generate statistics associated with features contained within the labeled examples. The statistics may be collected across multiple labeled examples in the resubmitted iteration, and a new model may be generated based on them. Here, the original model generated based on the original labeled examples may be updated based on using the original machine learning model within the machine learning system and generating a new machine learning model based on the original machine learning model. An iteration of training the machine learning system using an original machine learning model may be provided the same labeled examples as those used to generate the original machine learning model or, alternatively, may be provided new labeled examples, or a combination of new and original labeled examples.

Figure 4:
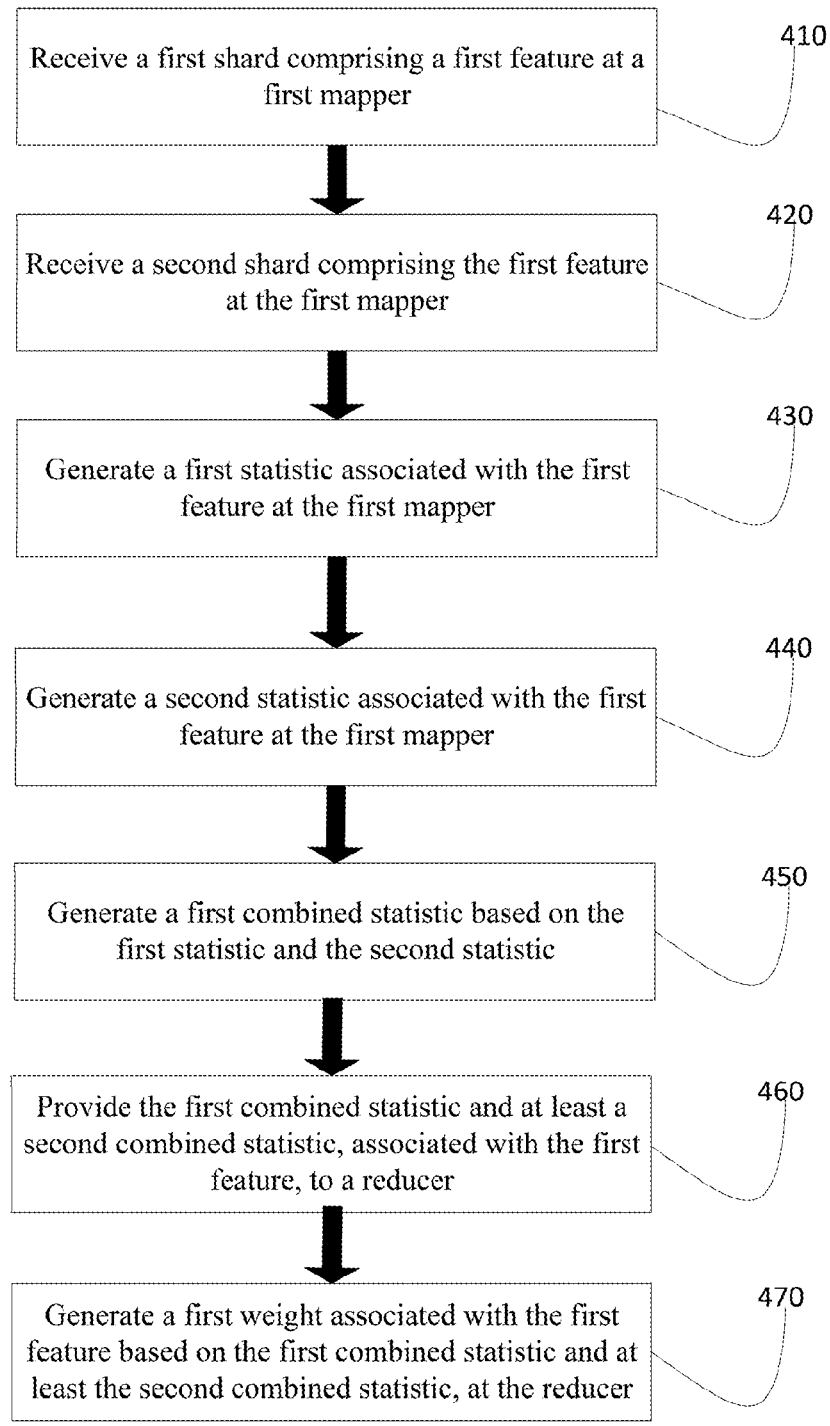
FIG. 4 shows an example process for generating weights, according to an implementation of the disclosed subject matter.

According to an implementation of the disclosed subject matter, FIG. 4 shows a machine learning system may be used to generate and/or update models that are used to make regression based predictions and/or provide rankings. It will be understood that one or more of the components shown in FIG. 4 may be located either local to a single entity (e.g., computer, database, server, etc.) or may be located across multiple entities. As shown in FIG. 4, labeled examples may be organized by shards, such as when processing a large amount of data from various sources and/or machines; it may be beneficial to organize the data by shards. In general, a shard is a portion of a larger data set. Shards may be generated or configured to meet various criteria relative to a data set. For example, shard may be generated such that each item of data in the data set appears in exactly one shard. Shards also may be configured such that each shard contains a specific portion of the data set space, and/or so that a randomly-selected data item is equally likely to appear in each of the shards. Referring to the example in FIG. 4, a data stream from a first source may be associated with a first shard, at 410, and a data stream from a second source may be associated with a second shard, at 420. A data stream may include labeled examples (i.e., training data) corresponding to specific instances of an event or action such as when a user selects a search query, or when a single video, from a plurality of videos, is viewed. A labeled example may contain features (i.e., observed properties such as a user being located in the USA, a user preferring to speak English, etc.) and may also contain a label corresponding to a resulting output (e.g., a user selected a search result, a user did not select the search result, a user viewed a video, etc.).

A machine learning system may contain one or more learners which include numerous workers such as a mapper or a reducer. A single mapper may receive labeled examples from multiple shards. As an example, a first mapper may receive example A from shard A and example B from shard B. Both examples may contain features F1, F2, and F3. The mapper may generate a first statistic, at 430, (e.g., that a user selected a search result) for F1 based on example A and a second statistic, at 440, (e.g., that a user selected a search result) for F1 based on example B. More specifically, the mapper may implement a +1 for F1 based on example A and a +1 for F1 based on example B. The two statistics, at 430 and 440, for F1 (i.e., +1 and +1) may be combined at the mapper, resulting in an overall mapper statistic 'MS1', at 450, for F1 of +2. Similarly, a different mapper may also receive examples from other shards, and generate an overall mapper statistic 'MS2' for F1 of +4, for example, based on the respective examples in those shards.

The overall mapper statistics (e.g., MS1 and MS2) for F1 may be provided to a reducer R1, at 460. The reducer R1 may be configured to collect overall mapper statistics from two or more mappers within the learner and generate a weight based on the collected mapper statistics. The reducer R1 may collect MS1 (i.e., +2) and may also collect MS2 (i.e., +4) and generate the over statistic +6 for the feature, at 470. The overall statistic +6, as well as a previously generated weight may be used as a new weight for the feature. Similarly, a second reducer R2 may receive overall mapper statistics for feature F2 and generate an overall statistic of −3, for example. The overall statistic, as well as a previously generated weight may be used to generate a new weight for the feature. The new weights may be used to generate a new model:

Model: OldWeight(F1)+(6*f(n))+OldWeight(F2)+
(−3*f(n)) . . . .

Figure 3:
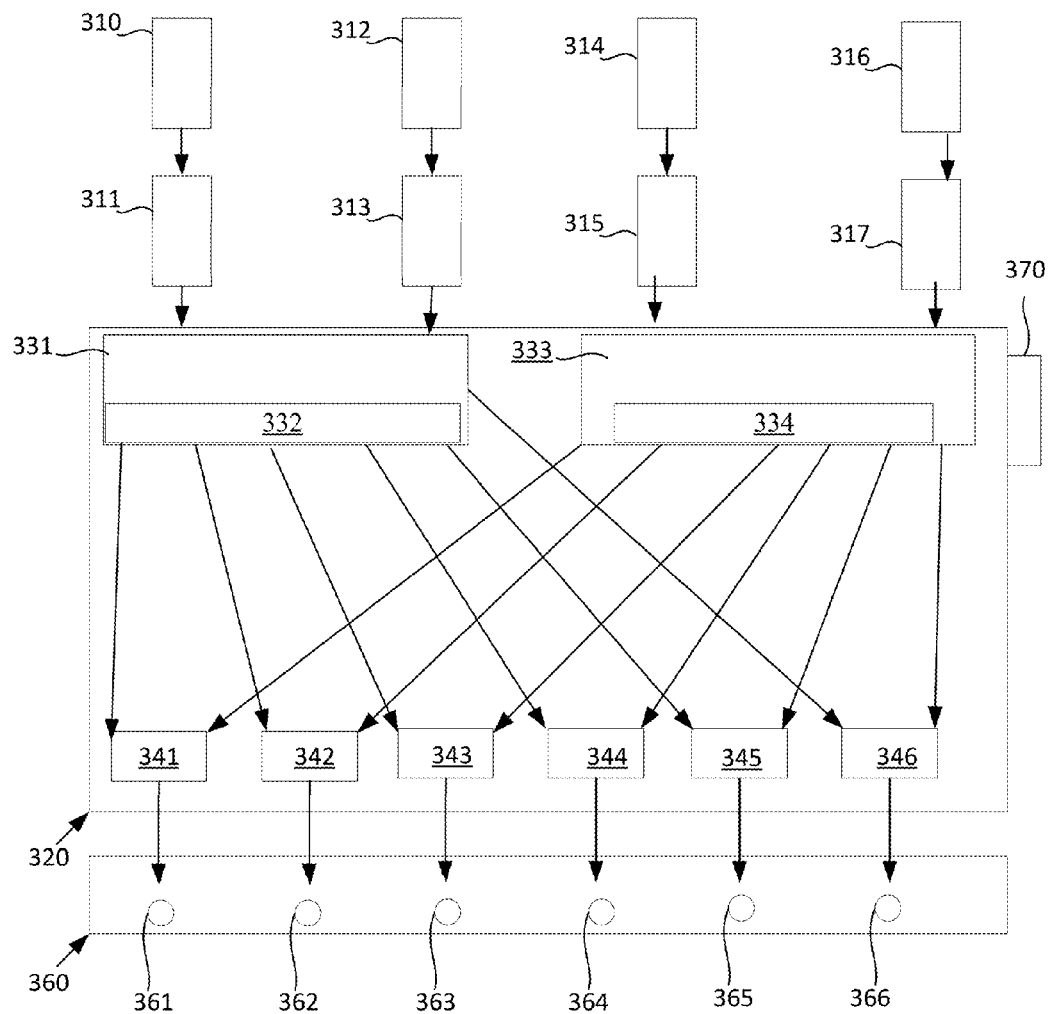
FIG. 3 shows an example illustration of a multi-shard machine learning system, according to an implementation of the disclosed subject matter.

As an illustrative example, FIG. 3 shows an example machine learning configuration according to an embodiment of the disclosed subject matter. Generally, a machine learning system may include multiple learners 320, each of which trains some or all of a machine learning model based upon example data provided to the learner. As shown, a learner component 320 may contain a plurality of worker components that can function as mappers 331, 333 (e.g., which may generate statistics for one or more features) or reducers (e.g., which may combine multiple statistics associated with a feature received from multiple mappers to generate an overall weight associated with the feature) within the learner 320. Each mapper 331, 333, may contain one or more combiners 332, 334 that are configured to combine statistics associated with similar features within the mapper. The learner 320 also may contain one or more reducers 341, 342, 343, 344, 345, and 346. The generalized operation of mappers, reducers, and combiners will be readily understood by one of skill in the art.

Conventional similar processes typically are referred to as mapreduce systems, after the two main sub-processes used in such a system.

A master controller 370 may be connected to the learner in any applicable manner such as a wired or wireless connection. The master controller 370 may provide instructions to the components of the machine learning system such as to instruct a worker to operate as a mapper or a reducer and may also control scheduling and data distribution tasks. As an example the master controller 370 may designate a worker as either a mapper or a reducer such that the master controller and the workers have a master/slave relationship. As another example, if a worker fails, its task may be reassigned to another worker process by the master process. In some implementations, the master process may undertake remedial measures to repair, restart, or replace a failed worker process. According to an implementation of the disclosed subject matter, a single worker may be assigned to be both a mapper and a reducer such that a portion of the worker may conduct the operations associated with a mapper and a portion of the worker may conduct the operations associated with a reducer. When a worker process completes its assigned task, it can inform the master process of the task status (e.g., complete or error). In some implementations, the worker process's status report may be treated by the master process as a request for another task. According to an implementation, the master controller 370 may instruct a worker to initially operate as a mapper, and when a task provided to the mapper reaches completion, the master controller 370 may instruct the worker to operate as a reducer. In a multi-threaded system, a worker process might simultaneously be a mapper and a reducer with different threads playing different roles.

Supervised learning data containing one or more labeled examples may be received by a mapper 331, 333. Generally, as disclosed herein, each labeled example includes a label (e.g., that indicates the result of a given action or event such as a video view) and one or more features. A label may be feedback corresponding to the example such as a binary indication (e.g., 0 or 1, good or bad, spam or not spam, relevant or not relevant, clicked on or not clicked on, etc.) or may be a form of learning/regression such that the label may be a real valued number (e.g., corresponding to the duration of a session, the amount spent, a number of visits, or the like). A feature may correspond to an individual measurable heuristic property of a phenomenon that may be observed and may either be present or not present. As specific examples, a feature may be a specific demographic property such as age (e.g., a 24 year old user), weight (e.g., 150 pounds), location (e.g., the United Kingdom), education (e.g., graduate degree), or the like; a user history property such as whether a specific link was selected, purchase history (e.g., a sweater bought from an online retailer), view history (e.g., a sweater recently viewed by the user), or the like; an association property such as an indication of whether a user is a member of a particular user group, whether a user is associated with a user account; the presence of a characteristic (e.g., keyword, a time associated with an action such as a when a purchase is made, etc.), or the like. As a specific illustrative sample, a labeled example may correspond to a search query, "dog training book". The features associated with the search query may be the age, gender, and country corresponding to the user that submitted the search query. Alternatively or in addition, a feature associated with the search query may be a search result selected by a user from among a plurality of search results.

According to implementations of the disclosed subject matter, the training data may be received in multiple shards, where each shard contains a portion of the training data. Each shard may contain multiple examples, such as shard 310, 311, 312, 313, 314, 315, 316, and 317. In general, a shard may include any number of examples. Each mapper may receive examples from one or more shards. For example, a first mapper 331 may receive examples from shards 310, 311, 312 and 313 contained in a first thread (containing shards 310 and 311) and a second thread (containing shards 312 and 313), a second mapper 333 may receive examples from shards 314, 315, 316 and 317 contained in the third thread (containing shards 314 and 315) and fourth thread (containing shards 316 and 317), and so on. As shown, multiple threads (e.g., 311 and 313) may be received at a single mapper (e.g., 331) at the same (or practically similar) time. A mapper may generate one or more statistics for one or more features extracted from the examples received by the mapper. The one or more statistics may be stored as either a positive statistic or a negative statistic (or a class based statistic, as disclosed herein), based on the labeled example associated with the statistic. More specifically, as an example, a statistic generated based on a positive example (e.g., an affirmative example corresponding to a Boolean value 1) may result in a statistic stored as positive statistic. In the illustrative system shown, mapper 331 may extract feature A from an example from shard 311. Based on a first example from shard 311, the mapper 331 may generate a statistic for feature A based on weights previously associated with the feature A. In a particular case, a first statistic for feature A may indicate the frequency of examples received by the mapper that have both a specific label and feature A. Similarly, based on a second example from shard 313, the mapper 331 may generate a second statistic for feature A based on weights previously associated with the feature A.

Similarly, mapper 333 may extract feature A from example 315. Based on a third example from shard 315, the mapper 333 may generate a third statistic for feature A based on weights previously associated with the feature A. Based on a fourth example from shard 317, the mapper 333 may generate a fourth statistic for feature A based on weights previously associated with the feature A.

The mapper 331 may contain a combiner 332 that receives both the first and second statistics for feature A. The combiner may combine the first and the second statistics to generate a first combined statistic for feature A. For example, the combiner may add the first statistic for feature A and the second statistic for feature A to generate a combined statistic for feature A.

Similarly, mapper 333 may contain a combiner 334 that receives both the third and fourth statistics for feature A. The combiner may combine the third and the fourth statistics to generate a second combined statistic for feature A.

The learner 320 may also contain one or more reducers 341, 342, 343, 344, 345, and 346, each of which receives statistics for a particular feature. Further, each reducer may generate a weight based on the combined statistics for a feature received from one or more mappers. In the illustrative system shown, reducer 341 may receive the first combined statistic for feature A from mapper 331 and the second combined statistic for feature A from mapper 333. The reducer may combine the first combined statistic and the second combined statistic to generate a weight associated with feature A.

A weight may be generated for feature B in a similar manner as the weight generated for feature A, according to the techniques disclosed above.

A model containing at least the weight for feature A and the weight for feature B may be generated. It will be understood that one or more other weights associated with one or more other features may also be included in the model.

Figure 5:
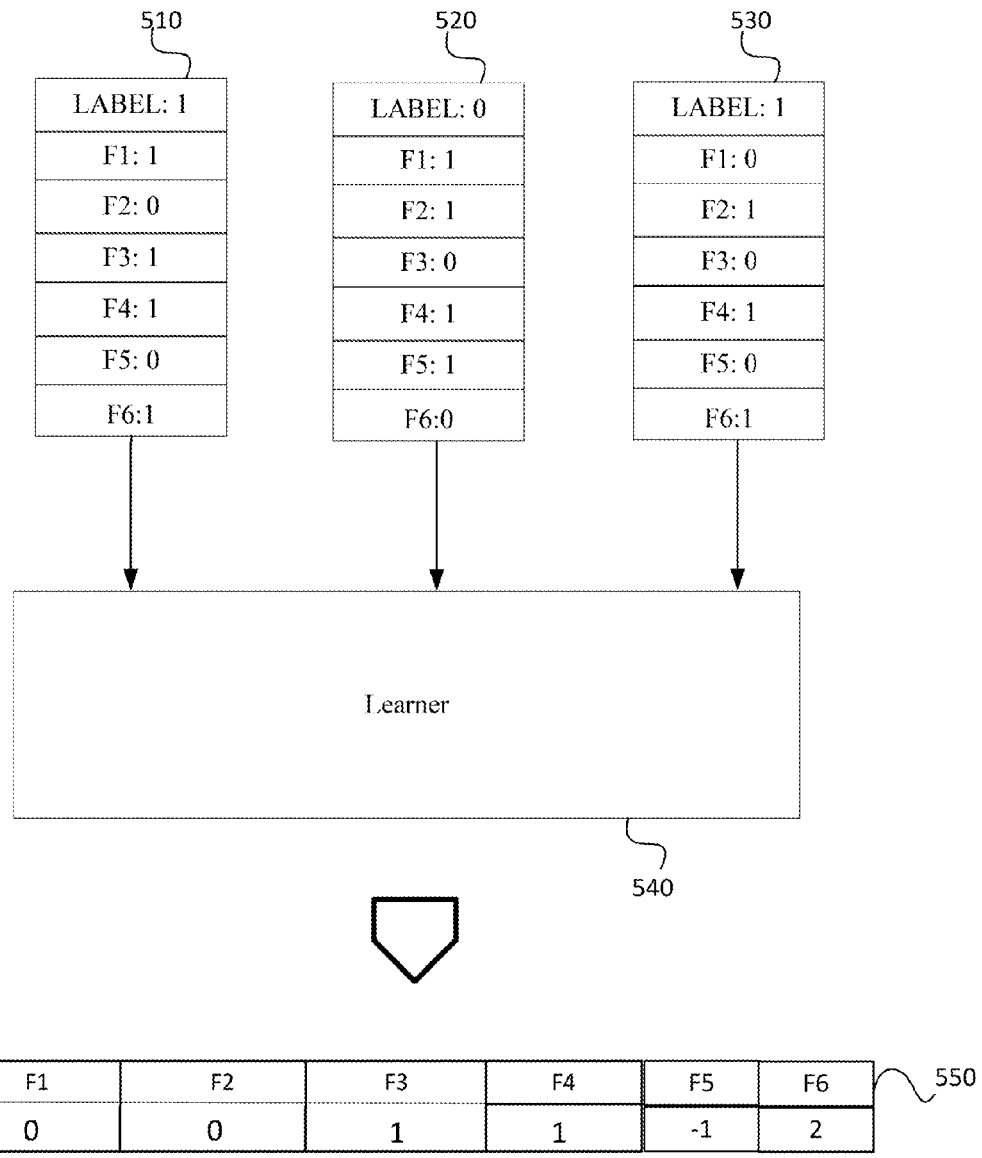
FIG. 5 shows an example illustration of multiple shards, according to an implementation of the disclosed subject matter.

As another illustrative example of receiving labeled examples and generating a model, as shown in FIG. 5, three labeled examples 510, 520, and 530 may be provided to a machine learner 540. Each of the examples may be labeled to indicate whether or not a user selected a link provided to the user in response to a search query. Accordingly, labeled examples 510 and 530 may contain positive outputs, as represented by the Boolean value 1 as the label. Labeled example 520 may contain a negative output, as represented by the Boolean value 0 as the label. The three labeled examples may be provided to the learner 540 and the learner may generate weights associated with at least features F1, F2, F3, F4, F5, and F6 based on the feature values in the examples 510, 520, and 530, according to the techniques disclosed herein. As a more specific example, the learner may receive the three labeled examples 510, 520, and 530 and, via mappers and reducers contained in the learners, as disclosed herein, may synthesize the feature data to generate respective weights. As disclosed herein, the examples may be received by one or more mappers that generate statistics. The statistics may be combined by receivers that generate the weights. Here, the feature values for 510 and 530 may, for example, be multiplied by 1 based on the positive outcome for 510 and 530. The feature values for 520 may, for example, be multiplied by −1 based on the negative outcome for 530. The resulting weight associated with F1 for this example may be 0 (i.e., sum((1)(1)+(−1)(1)+(1)(0)), for F2 may be 0 (i.e., sum((1)(0)+(−1)(1)+(1)(1)), for F3 may be 1 (i.e., sum((1)(1)+(−1)(0)+(1)(0)), for F4 may be 1 (i.e., sum((1)(1)+(−1)(1)+(1)(1)), F5 may be −1 (i.e., sum((1)(0)+(−1)(1)+(1)(0)), and F6 may be 2 (i.e., sum((1)(1)+(−1)(0)+(1)(1)), as shown by the machine learning model 550. The machine learning model 550 may be applied to unlabeled data to make predictions, as disclosed herein. Alternatively, as disclosed herein, the resulting weights may be generated based on the statistics such that, for example, the resulting weight associated with F1 may be e^0 (i.e., e^ sum((1)(1)+(−1)(1)+(1)(0)). It will be understood that the provided example may be illustrative of a portion of the machine learning system and other techniques, such as applying previous weights to generate a new weight, may be applied to generate weights associated with the features.

According to implementations of the disclosed subject matter, a generated model may be used by the machine learning system to make predictions based upon the statistics generated from the learned examples. For example, a model may be generated to predict the likelihood of a user selecting a specific search result for an automotive website. The model may contain weights w1, w2, and w3 for features associated with observed properties including a location being the United States, a preferred language being English, and a keyword 'automobiles' in a previous search query, respectively. The generated model may be applied to a search provider such that when a user conducts a search, the weights are applied to the features corresponding to the user conducting the search. More specifically, if it is detected that the user is located in the United States, prefers English, and has previously searched for "automobiles' then the weights w1, w2, and w3 associated with each of the features, respectively, may be used to predict the likelihood of the user selecting the search result for the automotive website. Based on the predicted likelihood, the automotive website search result may be presented to the user. Alternatively, if it is detected that the user is not located in the United States, but prefers English and has previously searched for "automobiles", then weights w2 and w3 may be used to predict the likelihood of the user selecting the search result for the automotive website.

According to an implementation of the disclosed subject matter, mappers, as disclosed herein, may generate a statistic based on an algorithm. The algorithm may be any applicable algorithm that is predetermined or dynamic. For example, the algorithm may incorporate collecting values (e.g., feature occurrences), adding related values, weighing values based on a model, performing an operation, or the like. An algorithm may be provided to the machine learning system by a user by any applicable input technique and in any applicable language (e.g., machine language, computer programming, etc.). Alternatively or in addition, an algorithm may be selected and applied to feature data in a labeled example based on the source of the example. For example, if the source shard corresponds to a database that has historically provided reliable data, then a first algorithm may be applied to generate statistics corresponding to the feature values received from that database. Alternatively, if the source shard, in the same learner, corresponds to a less reliable database, then a second algorithm may be applied to generate statistics corresponding to the feature values received from that less reliable database.

Techniques disclosed herein may reduce the number of resources needed to machine train a model by distinguishing between positive, negative, and/or class specific examples. As disclosed herein, positive examples may be associated with workers configured to receive positive examples, negative examples may be associated with workers configured to receive negative examples, and class specific examples may be associated with workers configured to receive examples for the respective class. Accordingly, the amount of memory required for a worker (e.g., a mapper or reducer) may be reduced as the worker may only receive, analyze, and generate statistics and/or weights based on half the data that would otherwise be processed by the worker (i.e., either negative, positive, or class specific). Additionally, a worker may not need to store information regarding whether a generated statistic corresponds to a positive outcome or a negative outcome, which allows the worker to operate using a smaller amount of memory, and/or to use the additional storage space that otherwise would be taken up with this information. As an example a first mapper may receive both positive and negative examples and, thus, may generate statistics corresponding to both the positive and the negative examples. The first mapper may provide both the statistics to a combiner or reducer. A second mapper may receive only positive examples and, thus may generate statistics corresponding to only the positive examples. The second mapper may operate more efficiently than the first mapper because it need not store labels corresponding to whether a statistic generated by the mapper is a positive statistic or a negative statistic.

Additionally, as disclosed herein, statistics, for a feature, generated across multiple mappers may be provided to a reducer that combines the cross-mapper statistics to generate a weight. Techniques disclosed herein may distinguish reducers as either positive reducers, negative reducers, or class specific reducers. Accordingly, a reducer may receive statistics from either mappers configured to receive positive examples, from mappers configured to receive negative examples, or from mappers configured to receive class specific examples. Effectively, as disclosed herein, the number of reducers that a mapper provides statistics to may be reduced based on the specialization of only positive or negative examples being provided to the mapper. Accordingly, the time and/or complexity involved with providing statistics to reducers may be reduced based on the number of reducers a mapper provides statistics to.

According to implementations of the disclosed subject matter, a labeled example is either a positive example, a negative example, or class specific example. A positive example may correspond to any affirmative example such as a selection, a click, a view, a presence, or the like. As specific examples, a positive property may be an affirmative result such as a user being located in the United States, a user selecting English as a preferred language, a user click or other selection of a search result, or the like. A negative example may correspond to any negative example such as an ignore, the lack of a property, a rejection, or the like. As specific examples, a negative property may be a negative result such as a user not having a broadband connection, a user not being located in the United States, a user ignoring a search result, a user selecting a different search result than a search result in question, or the like. As disclosed herein, a positive example may be represented by a value (e.g., a Boolean 1 in this example) and a negative example may be represented with a false value (e.g., a Boolean 0 in this example). It will be understood that positive examples and negative examples may be represented by any values that can be identified as corresponding to either a positive or a negative example such as a +1 and −1 pair, a 1 and 2 pair, an A and B pair, or the like.

FIG. 5 is an illustrative example of positive and negative examples. FIG. 5 contains two positive examples 510 and 530 and one negative example 520 as indicated by the label outputs corresponding to each labeled example. Here, the positive examples 510 and 530 both contain the label "1" whereas the negative example 520 contains the label "0".

Figure 8A:
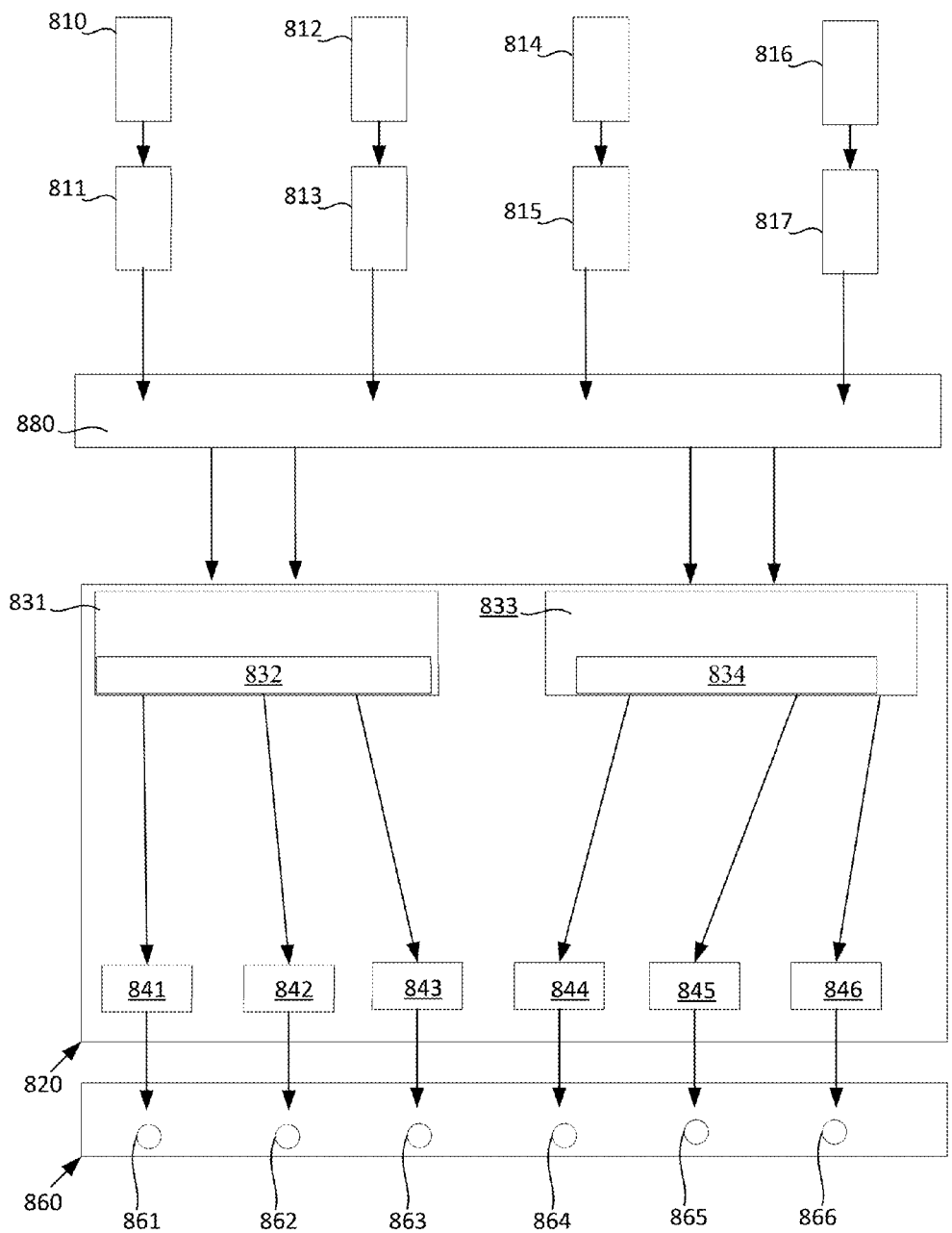
FIG. 8a shows an example illustration of a sign based multi-shard machine learning system, according to an implementation of the disclosed subject matter.

According to an implementation of the disclosed subject matter, labeled examples may be identified as either positive or negative using an example sorter. A machine learning system may include multiple learners, such as learner 820 in FIG. 8, each of which trains some or all of a machine learning model based upon sorted example data provided to the learner. The sorted example data may be sorted by the example sorter 880 which receives labeled examples from a plurality of shards. The labeled examples may be received in multiple shards, where each shard contains a portion of the training data. Each shard may contain multiple examples such that each shard 810, 811, 812 813, 814 815, 816 and 817 contains one or more examples. The shards may be received by the example sorter 880 and the example sorter 880 may determine whether an example is a positive example or a negative example. The example sorter 880 may determine whether an example is a positive example or a negative example based on a value (e.g., a Boolean value) associated with the example or based on the presence or omission of a feature.

As an illustrative example, the example sorter 880 determines whether an example is positive based on if the example label is a 1 and negative based on if the example label is a 0. The example sorter 880 provides the identified positive examples to mapper 831 and the identified negative examples to mapper 833. Mapper 831 generates statistics based on the received positive examples, according to techniques disclosed herein. The mapper need not associate the statistic as being a positive statistic or a negative as only positive statistics are provided to the mapper 831. Similarly, mapper 833 generates statistics based on the received negative examples, according to techniques disclosed herein. The mapper need not associate the statistic as being a positive statistic or a negative as only negative statistics are provided to the mapper 832. The statistics associated with positive examples that are generated by mapper 831 may be combined at combiner 832 such that a first positive statistic, related to the first feature, from a first labeled example may be combined with a second positive statistic, related to the same feature, from a second labeled example. Positive statistics may be similarly combined for a second and a third feature at 832. Additionally, the statistics associated with negative examples that are generated by mapper 833 may be combined at combiner 834 such that a first negative statistic, related to the first feature, from a third labeled example may be combined with a second negative statistic, related to the same feature, from a fourth labeled example. Negative statistics may be similarly combined for a second and a third feature at 834.

The learner 820 may also contain one or more reducers 841, 842, 843, 844, 845, and 846. Reducers 841, 842, and 843 may be configured to receive positive statistics and reducers 844, 845, and 846 may be configured to receive negative statistics. Each reducer may generate a weight based on the combined statistics for a feature received from one or more mappers. More specifically, positive reducers 841, 842, and 843 may receive positive statistics corresponding to a first, second, and third feature, respectively, and negative reducers may receive negative statistics corresponding to the first, second, and third feature, respectively. Notably, both sets of the positive and negative reducers receive statistics for the same respective features. However, the positive reducers receive only the positive statistics and the negative reducers receive only the negative statistics. In the illustrative system shown, reducer 841 may receive the first combined positive statistic for the first feature from mapper 831 and may also receive a second combined positive statistic for the first feature from another positive mapper (not shown). The reducer may combine the first combined positive statistic and the second combined positive statistic to generate a positive weight associated with the first feature. Similarly, reducers 842 and 843 may generate positive weights associated with the second and third features. Reducer 841 may receive the first combined negative statistic for the first feature from mapper 833 and may also receive a second combined negative statistic for the first feature from another negative mapper (not shown). The reducer may combine the first combined negative statistic and the second combined negative statistic and generate a negative weight associated with the first feature based on the combined statistics. Similarly, reducers 845 and 846 may provide combined statistics to generate negative weights associated with the second and third features.

Figure 8B:
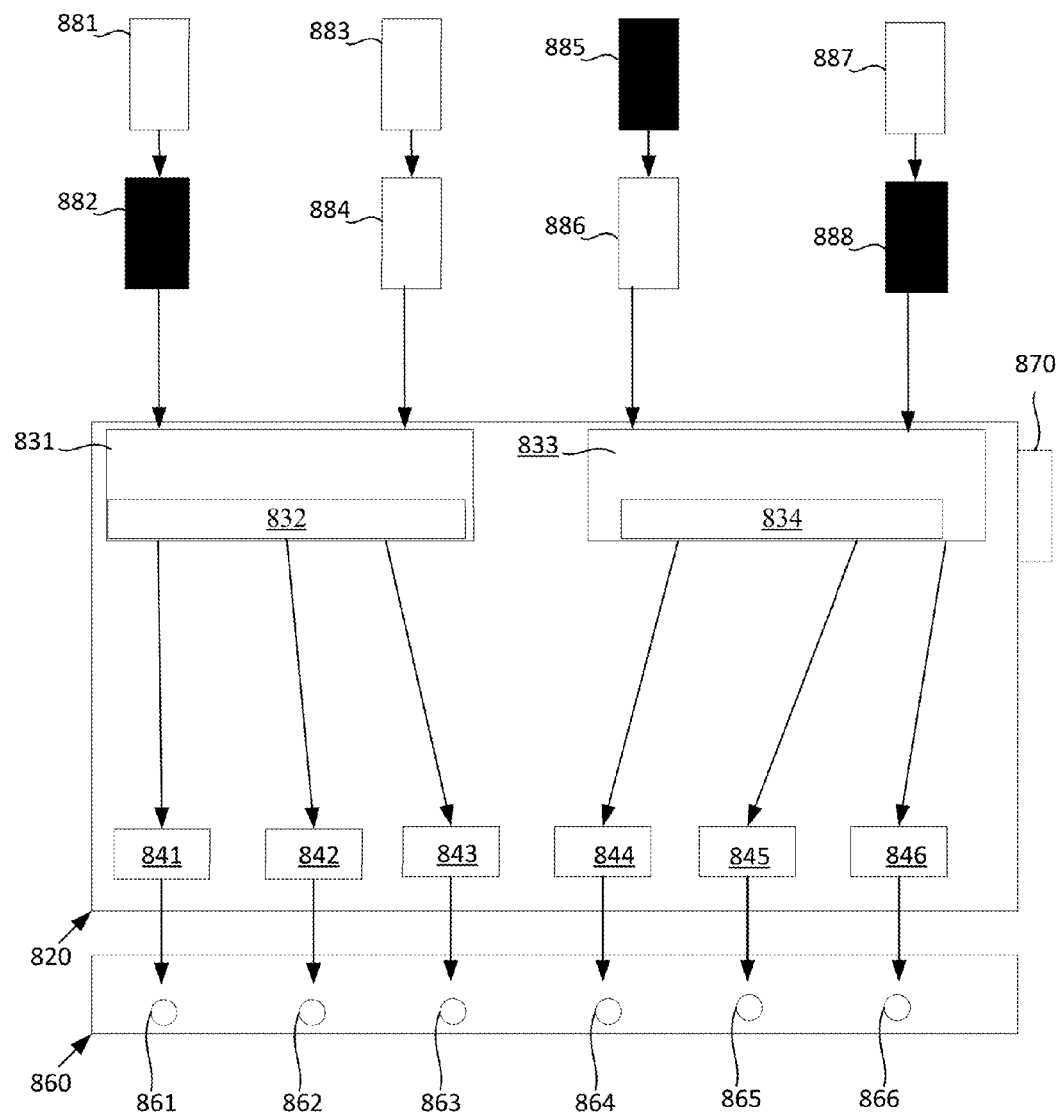
FIG. 8b shows another example illustration of a sign based multi-shard machine learning system, according to an implementation of the disclosed subject matter.

According to an implementation of the disclosed subject matter, shards containing labeled examples may be configured to only provide either positive or negative examples to positive mappers or negative mappers, respectively. As shown in FIG. 8b, the labeled examples may be received in multiple shards, where each shard contains a portion of the training data. Each shard may contain multiple examples 810 and 811, 812 and 813, 814 and 815, and 816 and 817. The shard source, the shard, a master controller, or any other applicable component may determine whether a given example is a positive example or a negative example based on a value (e.g., a Boolean value) associated with the example. Based on the determination, the given example may be provided to a respective mapper such that if an example is determined to be a negative example (e.g., Boolean value 0), then the example may not be provided to a mapper configured to receive positive examples. Similarly, if an example is determined to be a positive example, (e.g., Boolean value 1), then the example may not be provided to mapper configured to receive negative examples.

As an illustrative example, as shown in FIG. 8b, examples 881, 882, 883, 884, 885, 886, 887, and 888 may be provided to the machine learner 820 via multiple shards. Mapper 831 may be configured to receive positive examples and mapper 833 may be configured to receive negative examples. Positive mapper 831 may receive learned examples from shards that contain examples 881, 882, 883, and 884. Learned examples 881, 883, and 884 may be positive examples and learned example 882 may be a negative example. Accordingly, negative learned example 882 may not be provided to mapper 831 as mapper 831 is configured to receive only positive examples. Negative mapper 833 may receive learned examples from shards that contain examples 885, 886, 887, and 888. Learned examples 886 and 887 may be positive examples and learned examples 885 and 88 may be negative examples. Accordingly, positive learned examples from shards 886 and 887 may not be provided to mapper 833 as mapper 833 is configured to receive only negative examples. As disclosed herein, the positive and negative mappers may generate respective statistics and provide the statistics to similarly configured positive and negative reducers, respectively. Accordingly, each reducer may generate positive or negative weights (i.e., generate positive results if it receives positive statistics from a positive mapper and generate negative results if it receives negative results from a negative mapper).

Figure 9:
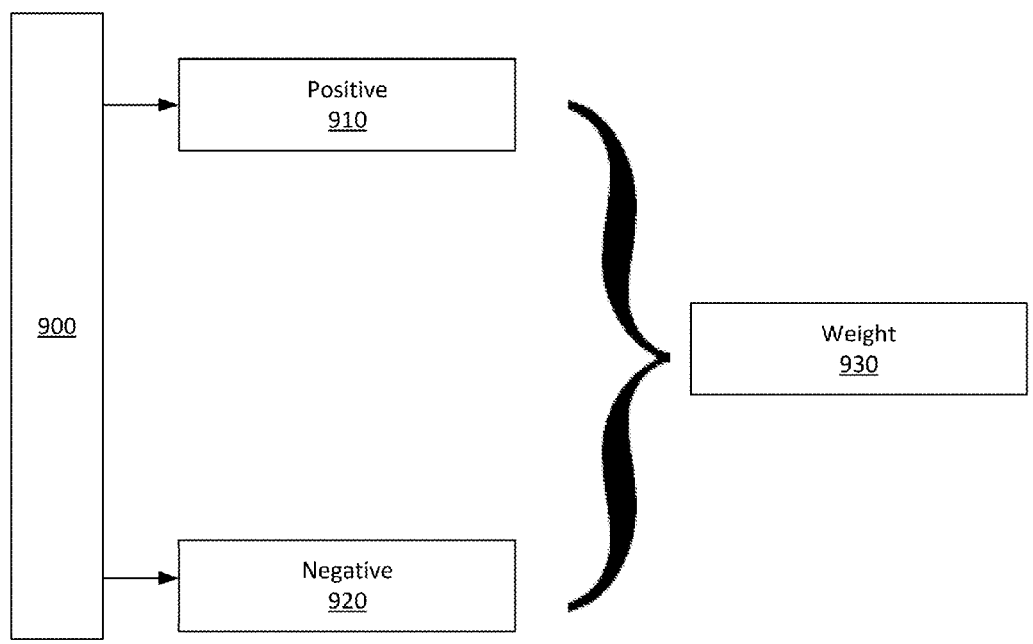
FIG. 9 shows an example process for a sign based weight calculation, according to an implementation of the disclosed subject matter.

A machine learning model may be generated based on both the positive or negative weights provided by the positive and negative reducers. As an example, as shown in FIG. 9, a learner 900 may provide two separate weights for a feature A; a positive weight 910, and a negative weight 920. The machine learning model may maintain both the positive weight 910 and 920 and apply the two weights separately. Alternatively, the positive 910 and negative weights 920 for a feature may be combined to produce an overall weight 930. As an example, a machine learner may generate a positive weight 'PW1' 4.2 for feature 1 and a negative weight 'NW1' 3.4 for the same feature one. The PW1 and NW1 may be combined to generate an overall weight OW1 0.8 for feature one such that the NW1 (i.e., 3.4) is subtracted from the PW1 (i.e., 4.2) to result in an OW1 of 0.8.

Figure 10A:
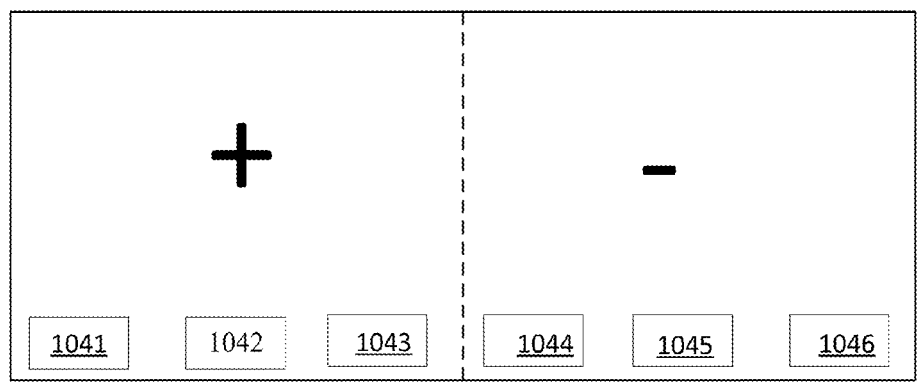
FIG. 10a shows an example illustration of sign signed workers, according to an implementation of the disclosed subject matter.
Figure 10B:
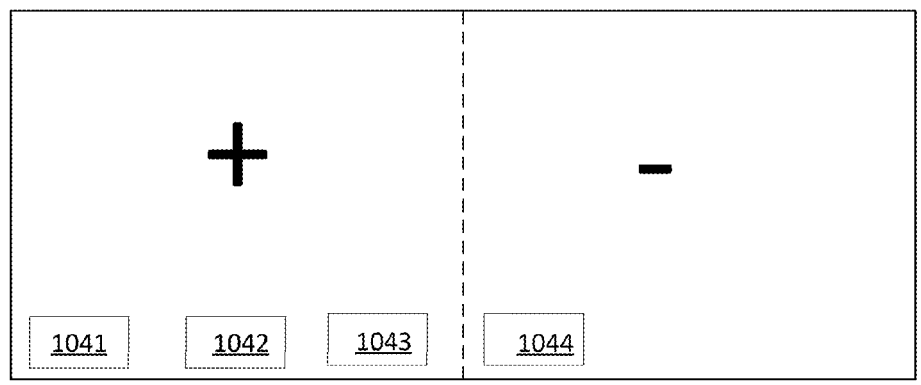
FIG. 10b shows an illustration of sign signed workers, according to an implementation of the disclosed subject matter.
Figure 10C:
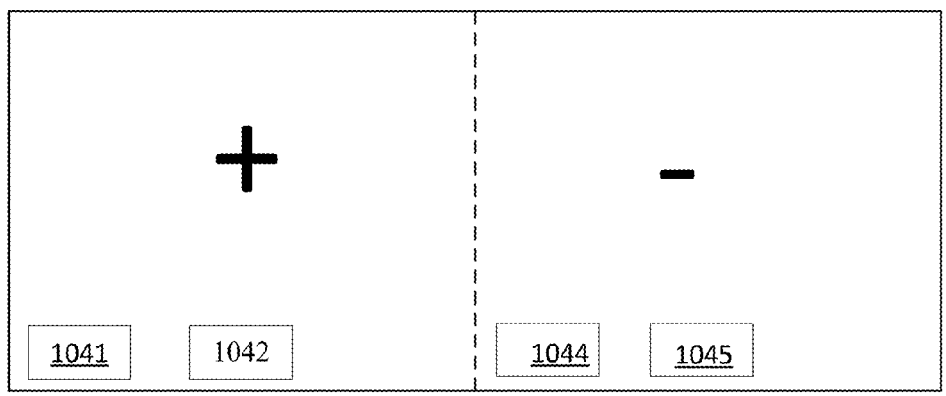
FIG. 10c shows an example illustration of sign signed workers, according to an implementation of the disclosed subject matter.
Figure 11:
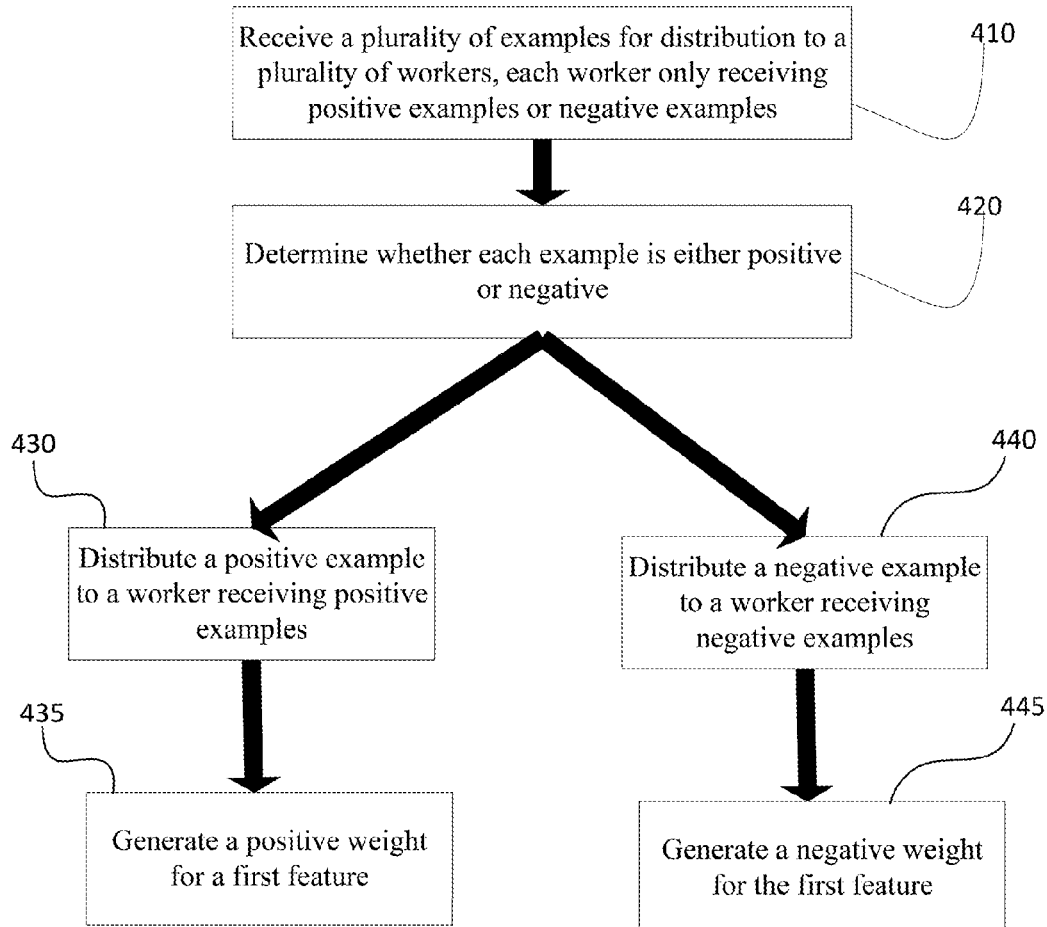
FIG. 11 shows an example illustration of generating weights, according to an implementation of the disclosed subject matter.

According to an implementation of the disclosed subject matter, one or more workers may be removed from machine learner. The one or more workers (e.g., mapper or reducer) may be removed based on the number of workers required for a machine learner being reduced due to any applicable reason such as a reduction in the number of learned examples to analyze, the consistency of features (e.g., the same features regularly do not appear in examples), or the like. The one or more removed workers may be provided to one or more other learners different from the learner that they are removed from. As disclosed herein, a worker may be configured to receive/analyze either positive examples or negative examples. For example, as shown in FIG. 10a, workers 1041, 1042, and 1043 may be configured to receive/analyze positive examples, and workers 1044, 1045, and 1046 may be configured to receive/analyze negative examples. As shown in FIG. 10b, two workers 1045 and 1046 may be removed. The workers may be removed based on a reduction in number of learned examples provided to the learner that the workers are associated with. In the example, the removal results in only one worker 1044 remaining associated with negative examples, and three workers 1041, 1042, and 1043 remaining associated with positive examples. Here, the removal of the two negative workers may be arbitrary or may be a result of the number of negative examples being reduced more significantly than the number of positive examples. According to an implementation, an example of which is shown in FIG. 10c a number of positive and negative workers may be removed based on a factor such as a percentage of positive and/or negative examples received, the average number of positive and/or negative examples received, a threshold amount of idle time (e.g., time during which one or more workers does not receive/analyze either positive or negative examples), a frequency at which examples are received, or the like. As an example, as shown in FIG. 10a, workers 1041, 1042, and 1043 may be positive workers and 1044, 1045, and 1046 may be negative workers within a learner. The frequency at which the workers receive examples may fall below a given threshold such that only four workers are required instead of six. Accordingly, as shown in FIG. 10c, two positive workers 1041 and 1042 may remain as well as negative workers 1044 and 1045. Notably, both positive and negative workers are removed instead of only removing either positive or negative workers.

Figure 1:
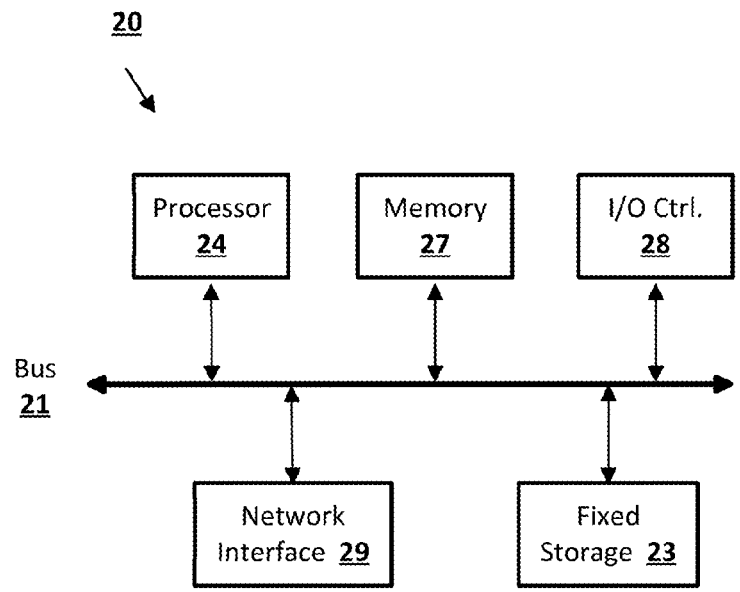
FIG. 1 shows a computer according to an implementation of the disclosed subject matter.

Implementations of the presently disclosed subject matter may be implemented in and used with a variety of component and network architectures. FIG. 1 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 2.

Many other devices or components (not shown) may be connected in a similar manner, such as document scanners, digital cameras, auxiliary, supplemental, or backup systems, or the like. Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 2:
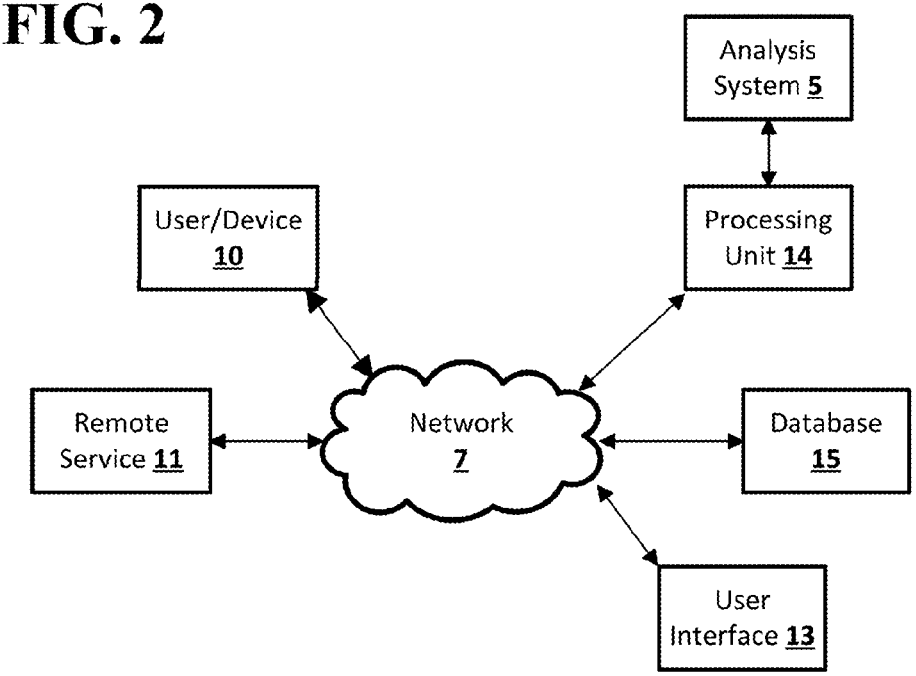
FIG. 2 shows a network configuration according to an implementation of the disclosed subject matter.

FIG. 2 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive instructional course content from the instructional course provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by an instructional course provider.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method implemented by a computerized machine learning system, said method comprising:
  receiving, at the computerized machine learning system, a plurality of examples, separable by feature into at least two classes, for distribution to a plurality of workers in a mapreduce process, each worker only receiving examples associated with a first class or a second class, wherein the first class is a positive class and the second class is a negative class, and wherein a worker is selected from the group consisting of a mapper and a reducer;
  determining whether each example is either associated with the first class or associated with the second class;
  distributing an example associated with the first class to a first worker of the plurality of workers in the machine learning system, the first worker receiving only examples associated with the first class; and
  distributing an example associated with the second class to a second worker of the plurality of workers in the machine learning system, the second worker receiving only examples associated with the second class.

2. The method of claim 1, wherein the plurality of examples are from a learned training dataset.

3. The method of claim 1, wherein determining whether each example is either associated with the first class or the second class is conducted by an example sorter.

4. The method of claim 1, further comprising blocking examples associated with the second class from being distributed to a worker receiving only examples associated with the first class.

5. The method of claim 1, further comprising blocking examples associated with the first class from being distributed to a worker receiving only examples associated with the second class.

6. The method of claim 1, further comprising generating an updated weight based on an original weight and a weight function, wherein the weight function contains inputs selected from the group consisting of a positive statistic, a negative statistic, and a class specific statistic.

7. The method of claim 6, wherein the positive statistic is generated based on one or more workers that receives positive examples and wherein the negative statistic is generated based on one or more workers that receives negative examples.

8. The method of claim 1, further comprising:
  determining that a threshold number of examples from the plurality of examples has been distributed; and
  removing one or more workers from the plurality of workers, based on the determination.

9. The method of claim 8, wherein removing one or more workers form the plurality of workers further comprises:
  removing a first number of workers associated with examples associated with the first class based on a number of examples associated with the first class being distributed; and
  removing a second number of workers associated with examples associated with the second class based on a number of examples associated with the second class being distributed.

10. The method of claim 9, wherein the first number is based upon the number of distributed examples associated with the first class.

11. The method of claim 9, wherein the second number is based upon the number of distributed examples associated with the second class.

12. The method of claim 1, further comprising:
  determining that a frequency of examples received is below a threshold frequency; and
  removing one or more workers from the plurality of workers, based on the determination.

13. A machine learning system comprising:
one or more computers and one or more storage devices storing instructions that are operable, when executed by the one or more computers, to cause the one or more computers to perform operations comprising:
receiving a plurality of examples, separable by feature into at least two classes, for distribution to a plurality of workers in a mapreduce process, each worker only receiving examples associated with a first class or a second class, wherein the first class is a positive class and the second class is a negative class, and wherein a worker is selected from the group consisting of a mapper and a reducer;
determining whether each example is either associated with the first class or associated with the second class;
distributing an example associated with the first class to a first worker of the plurality of workers in the machine learning system, the first worker receiving only examples associated with the first class; and
distributing an example associated with the second class to a second worker of the plurality of workers in the machine learning system, the second worker receiving only examples associated with the second class.

14. The system of claim 13, wherein the plurality of examples are from a learned training dataset.

15. The system of claim 13, wherein the operations further comprise determining whether each example is either associated with the first class or the second class is conducted by an example sorter.

16. The system of claim 13, wherein the operations further comprise blocking examples associated with the second class from being distributed to a worker receiving only examples associated with the first class.

17. The system of claim 13, wherein the operations further comprise blocking examples associated with the first class from being distributed to a worker receiving only examples associated with the second class.

18. The system of claim 13, the operations further comprise generating an updated weight based on an original weight and a weight function, wherein the weight function contains inputs selected from the group consisting of a statistic associated with the first class and a statistic associated with the second class.

19. The system of claim 18, wherein the statistic associated with the first class is generated based on one or more workers that receives examples associated with the first class and wherein the statistic associated with the second class is generated based on one or more workers that receives examples associated with the second class.

20. The system of claim 13, the operations further comprise blocking:
determining that a threshold number of examples from the plurality of examples has been distributed; and
removing one or more workers from the plurality of workers, based on the determination.

21. The system of claim 20, wherein removing one or more workers form the plurality of workers further comprises:
removing a first number of workers associated with examples associated with the first class based on a number of examples associated with the first class being distributed; and
removing a second number of workers associated with examples associated with the second class based on a number of examples associated with the second class being distributed.

22. The system of claim 21, wherein the first number is based upon the number of distributed examples associated with the first class.

23. The system of claim 21, wherein the second number is based upon the number of distributed examples associated with the second class.

24. The system of claim 13, the operations further comprise blocking:
determining that a frequency of examples received is below a threshold frequency; and
removing one or more workers from the plurality of workers, based on the determination.

25. A computer program product, encoded on one or more non-transitory computer storage media, comprising instructions that when executed by one or more computers cause the one or more computers to perform operations comprising:
receiving, at a computerized machine learning system, a plurality of examples, separable by feature into at least two classes, for distribution to a plurality of workers in a mapreduce process, each worker only receiving examples associated with a first class or a second class, wherein the first class is a positive class and the second class is a negative class, and wherein a worker is selected from the group consisting of a mapper and a reducer;
determining whether each example is either associated with the first class or associated with the second class;
distributing an example associated with the first class to a first worker of the plurality of workers in the machine learning system, the first worker receiving only examples associated with the first class; and
distributing an example associated with the second class to a second worker of the plurality of workers in the machine learning system, the second worker receiving only examples associated with the second class.

26. The computer program product of claim 25, wherein the plurality of examples are from a learned training dataset.

27. The computer program product of claim 25, wherein the operations further comprise determining whether each example is either associated with the first class or the second class is conducted by an example sorter.

28. The computer program product of claim 25, wherein the operations further comprise blocking examples associated with the second class from being distributed to a worker receiving only examples associated with the first class.

29. The computer program product of claim 25, wherein the operations further comprising blocking examples associated with the first class from being distributed to a worker receiving only examples associated with the second class.

30. The computer program product of claim 25, wherein the operations further comprise generating an updated weight based on an original weight and a weight function, wherein the weight function contains inputs selected from the group consisting of a statistic associated with the first class and a statistic associated with the second class.

31. The computer program product of claim 30, wherein the statistic associated with the first class is generated based on one or more workers that receives examples associated with the first class and wherein the statistic associated with the second class is generated based on one or more workers that receives examples associated with the second class.

32. The computer program product of claim 25, wherein the operations further comprise:
determining that a threshold number of examples from the plurality of examples has been distributed; and
removing one or more workers from the plurality of workers, based on the determination.

33. The computer program product of claim 32, wherein removing one or more workers form the plurality of workers further comprises:
- removing a first number of workers associated with examples associated with the first class based on a number of examples associated with the first class being distributed; and
- removing a second number of workers associated with examples associated with the second class based on a number of examples associated with the second class being distributed.

34. The computer program product of claim 33, wherein the first number is based upon the number of distributed examples associated with the first class.

35. The computer program product of claim 33, wherein the second number is based upon the number of distributed examples associated with the second class.

36. The computer program product of claim 25, wherein the operations further comprise:
- determining that a frequency of examples received is below a threshold frequency; and
- removing one or more workers from the plurality of workers, based on the determination.

\* \* \* \* \*